(12) United States Patent
Phillips et al.

(10) Patent No.: US 7,753,819 B2
(45) Date of Patent: Jul. 13, 2010

(54) EIGHT SPEED AUTOMATIC TRANSMISSION

(75) Inventors: Andrew W. Phillips, Saline, MI (US);
Scott H. Wittkopp, Ypsilanti, MI (US);
James M. Hart, Belleville, MI (US);
Clinton E. Carey, Monroe, MI (US);
Madhusudan Raghavan, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 334 days.

(21) Appl. No.: 12/045,236

(22) Filed: Mar. 10, 2008

(65) Prior Publication Data
US 2008/0242488 A1 Oct. 2, 2008

Related U.S. Application Data

(60) Provisional application No. 60/908,799, filed on Mar. 29, 2007.

(51) Int. Cl.
*F16H 3/62* (2006.01)
(52) U.S. Cl. ...................................... 475/275
(58) Field of Classification Search ................ None
See application file for complete search history.

(56) References Cited

U.S. PATENT DOCUMENTS

| | | | |
|---|---|---|---|
| 4,038,888 A * | 8/1977 | Murakami et al. | 475/276 |
| 6,176,803 B1 | 1/2001 | Meyer et al. | |
| 6,558,287 B2 | 5/2003 | Hayabuchi et al. | |
| 6,764,425 B2 * | 7/2004 | Lee et al. | 475/280 |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,101,305 B2 | 9/2006 | Tabata et al. | |
| 7,163,484 B2 | 1/2007 | Klemen | |
| 2005/0090362 A1 | 4/2005 | Abe et al. | |
| 2006/0270513 A1 | 11/2006 | Klemen | |
| 2006/0270516 A1 | 11/2006 | Klemen | |
| 2009/0192005 A1* | 7/2009 | Carey et al. | 475/205 |

* cited by examiner

*Primary Examiner*—Dirk Wright

(57) ABSTRACT

An automatic transmission is provided having an input member, an output member, four planetary gear sets, a plurality of coupling members and a plurality of torque transmitting devices. Each of the planetary gear sets includes first, second and third members. The torque transmitting devices may include clutches and brakes.

15 Claims, 2 Drawing Sheets

| GEAR STATE | GEAR RATIO | RATIO STEP | TORQUE TRANSMITTING DEVICES ||||| 
|---|---|---|---|---|---|---|---|
| | | | 26 | 32 | 28 | 30 | 34 |
| REV | -2.700 | | X | X | | | X |
| N | | -0.59 | O | O | | | O |
| 1ST | 4.560 | | X | X | | X | |
| 2ND | 3.360 | 1.36 | X | X | X | | |
| 3RD | 2.000 | 1.68 | | X | X | X | |
| 4TH | 1.553 | 1.29 | | X | X | | X |
| 5TH | 1.333 | 1.16 | | X | | X | X |
| 6TH | 1.000 | 1.33 | | | X | X | X |
| 7TH | 0.781 | 1.28 | X | | | X | X |
| 8TH | 0.667 | 1.17 | X | | X | | X |

X = ON - ENGAGED CARRYING TORQUE
O = ON - ENGAGED NOT CARRYING TORQUE

FIG. 3

EIGHT SPEED AUTOMATIC TRANSMISSION

CROSS-REFERENCE TO RELATED APPLICATIONS

This application claims the benefit of U.S. Provisional Application No. 60/908,799 filed on Mar. 29, 2007. The disclosure of the above application is incorporated herein by reference.

FIELD

The invention relates generally to a multiple speed automatic transmission having a plurality of planetary gear sets and a plurality of torque transmitting devices and more particularly to an eight speed automatic transmission having four planetary gear sets and a plurality of torque transmitting devices.

BACKGROUND

The statements in this section merely provide background information related to the present disclosure and may or may not constitute prior art.

A typical multiple speed automatic transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current automatic transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed automatic transmission.

SUMMARY

An automatic transmission is provided having an input member, an output member, four planetary gear sets, a plurality of coupling members and a plurality of torque transmitting devices. Each of the planetary gear sets include first, second and third members. The torque transmitting devices may be either clutches or brakes. A first interconnecting member continuously interconnects the first member of the first planetary gear set with the first member of the second planetary gear set. A second interconnecting member continuously interconnects the second member of the first planetary gear set with the second member of the second planetary gear set. A third interconnecting member continuously interconnects the third member of the second planetary gear set with the third member of the third planetary gear set. A fourth interconnecting member continuously interconnects the first member of the third planetary gear set with the first member of the fourth planetary gear set. Five torque transmitting devices are selectively engageable to interconnect one of the first, second, and third members with at least one other of the first members, second members, third members, and a stationary member. The torque transmitting devices are selectively engageable in combinations of at least three to establish at least eight forward speed ratios and at least one reverse speed ratio between the input member and the output member.

In an aspect of the present invention, a first of the five torque transmitting devices is selectively engageable to interconnect the second member of the third planetary gear set with the stationary member.

In an aspect of the present invention, a second of the five torque transmitting devices is selectively engageable to interconnect the third member of the first planetary gear set with the second member of the third planetary gear set.

In an aspect of the present invention, a third of the five torque transmitting devices is selectively engageable to interconnect the third member of the first planetary gear set with the first member of the third planetary gear set.

In an aspect of the present invention, a fourth of the five torque transmitting devices is selectively engageable to interconnect the second member of the fourth planetary gear set with the stationary member.

In an aspect of the present invention, a fifth of the five torque transmitting devices is selectively engageable to interconnect at least one of the third member of the fourth planetary gear set and the output member with the first member of the second planetary gear set.

In an aspect of the present invention, the third member of the first planetary gear set, the third member of the second planetary gear set, third member of the third planetary gear set and the second member of the fourth planetary gear set are sun gears, the first member of the second, third and fourth planetary gear sets and second member of the first planetary gear set are carrier members and the first member of the first planetary gear set, second member of the second planetary gear set, the second member of the third planetary gear set and the third member of the fourth planetary gear set are ring gears.

In an aspect of the present invention, the input member is continuously interconnected with at least one of the second member of the first planetary gear set and the second member of the second planetary gear set and wherein the output member is continuously interconnected with the third member of the fourth planetary gear set.

In an aspect of the present invention, two of the torque transmitting devices are brakes and three of the torque transmitting devices are clutches.

In an aspect of the present invention, the stationary member is a transmission housing.

In another aspect of the present invention, a transmission is provided having an input member, an output member, first, second, third and fourth planetary gear sets each having a sun gear, a carrier member, and a ring gear. The input member is continuously interconnected with at least one of the carrier member of the first planetary gear set and the ring gear of the second planetary gear set. The output member is continuously interconnected with the ring gear of the fourth planetary gear set. A first interconnecting member continuously interconnects the ring gear of the first planetary gear set with the carrier member of the second planetary gear set. A second interconnecting member continuously interconnects the carrier member of the first planetary gear set with the ring gear of the second planetary gear set. A third interconnecting member continuously interconnects the sun gear of the second planetary gear set with the sun gear of the third planetary gear set. A fourth interconnecting member continuously interconnects the carrier member of the third planetary gear set with the carrier member of the fourth planetary gear set. A first torque transmitting device is selectively engageable to interconnect the ring gear of the third planetary gear set with a stationary member. A second torque transmitting device is selectively engageable to interconnect the sun gear of the first planetary gear set with the ring gear of the third planetary gear set. A third torque transmitting device is selectively engageable to interconnect the sun gear of the first planetary gear set with the carrier member of the third planetary gear set. A fourth torque transmitting device is selectively engageable to interconnect the sun gear of the fourth planetary gear set with the stationary member. A fifth torque transmitting device is selectively engageable to interconnect at least one of the ring gear of the fourth planetary gear set and the output member with the carrier member of the second planetary gear set. The torque transmitting devices are selectively engageable in combinations of at least three to establish at least eight forward speed ratios and at least one reverse speed ratio between the input member and the output member.

Further aspects, features and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting clutches and brakes in each of the available forward and reverse speeds or gear ratios of the automatic transmission illustrated in FIGS. 1 and 2.

DETAILED DESCRIPTION

The following description is merely exemplary in nature and is not intended to limit the present disclosure, application, or uses. Referring now to At the outset, it should be appreciated that in the particular example provided, the eight speed automatic transmission of the present invention has an arrangement of permanent mechanical connections between the members of the four planetary gear sets. A first component or member of a first planetary gear set is permanently coupled to a first component or member of a second planetary gear set. A second component or member of a first planetary gear set is permanently coupled to a second component or member of a second planetary gear set. A third component or member of the second planetary gear set is permanently coupled to a third component or member of the third planetary gear set. A first component or member of a third planetary gear set is permanently coupled to a first component or member of a fourth planetary gear set.

Figure 1:
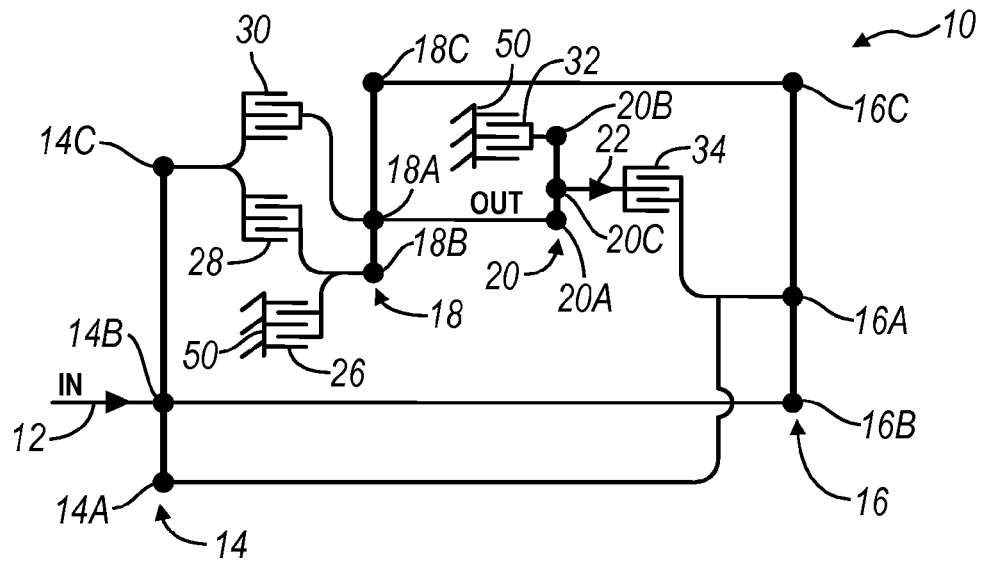
FIG. 1 is a lever diagram of an embodiment of an eight speed automatic transmission according to the present invention.

FIG. 1, a first embodiment of an eight speed automatic transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, which is hereby fully incorporated by reference.

The automatic transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The first node 14A of the first planetary gear set 14 is coupled to the first node 16A of the second planetary gear set 16. The second node 14B of the first planetary gear set 14 is coupled to the second node 16B of the second planetary gear set 16. The third node 16C of the second planetary gear set 16 is coupled to third node 18C of the third planetary gear set 18. The first node 18A of the third planetary gear set 18 is coupled to first node 20A of the fourth planetary gear set 20. The second node 14B of the first planetary gear set 14 and the second node 16B of the second planetary gear set 16 is coupled to the input 12. The output shaft or member 22 is coupled to the third node 20C of the fourth planetary gear set 20.

A first brake 26 selectively connects the second node 18B of the third planetary gear set 18 to the ground or transmission housing 50. A first clutch 28 selectively connects the third node 14C of the first planetary gear set 14 to the second node 18B of the third planetary gear set 18. A second clutch 30 selectively connects the third node 14C of the first planetary gear set 14 to the first node 18A of the third planetary gear set 18. A second brake 32 selectively connects the second node 20B of the fourth planetary gear set 20 to ground or the housing 50 of transmission 10. A third clutch 34 selectively connects the first node 16A of the second planetary gear set 16 to the third node 20C of the fourth planetary gear set 20 and to output 22.

Figure 2:
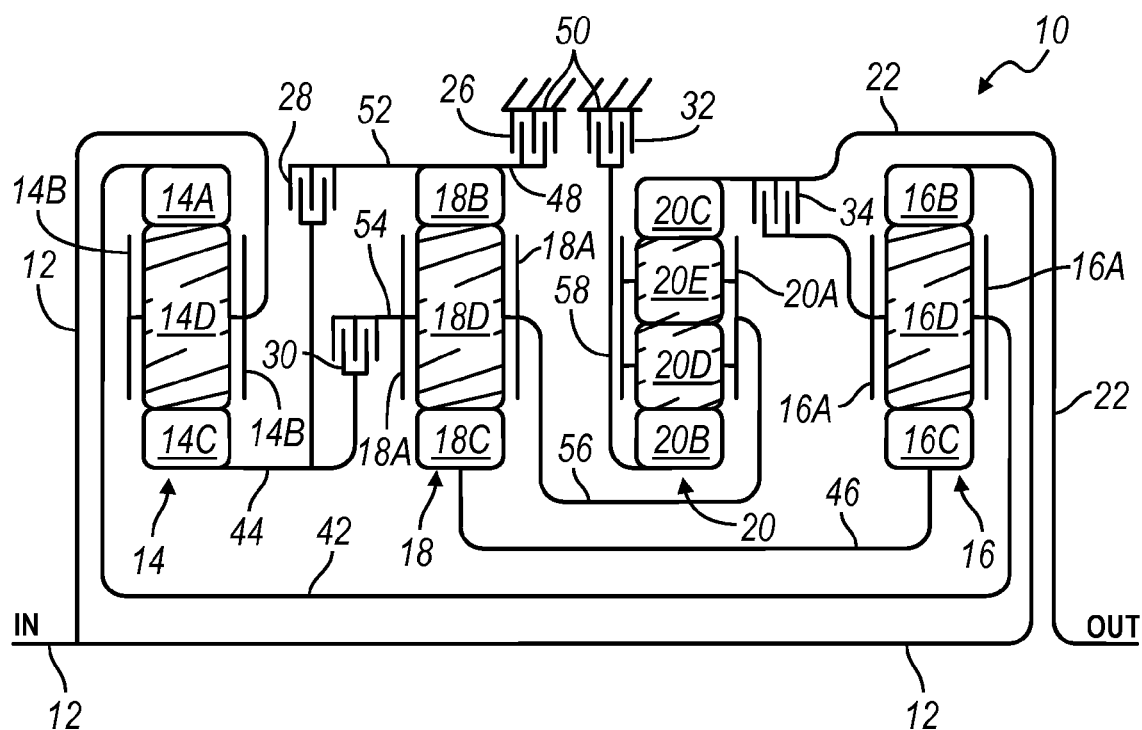
FIG. 2 is a diagrammatic view of an embodiment of an eight speed automatic transmission according to the present invention.

Referring now to FIG. 2, a stick diagram presents a schematic layout of the embodiment of the eight speed transmission 10 according to the present invention. In FIG. 2, the numbering from the lever diagram of FIG. 1 is carried over. The clutches, brakes and couplings are correspondingly presented whereas the nodes of the planetary gear sets now appear as components of planetary gear sets such as sun gears, ring gears, planet gears and planet gear carriers.

For example, planetary gear set 14 is a planetary gear set that includes a ring gear member 14A, a planet gear carrier member 14B and a sun gear member 14C. Ring gear member 14A is connected for common rotation with first interconnecting shaft or member 42. The planet gear carrier member 14B rotatably supports a set of planet gears 14D (only one shown) and is connected for common rotation with input shaft or member 12. Sun gear member 14C is connected for common rotation with second interconnecting shaft or member 44. Planet gears 14D are each configured to intermesh with both sun gear member 14C and ring gear member 14A.

The input shaft or member 12 is continuously connected to an engine (not shown) or to a turbine of a torque converter (not shown). The output shaft or member 22 is continuously connected with the final drive unit or transfer case (not shown).

Planetary gear set 16 is a planetary gear set that includes a sun gear member 16C, a planet carrier member 16A that rotatably supports a set of planet gears 16D and a ring gear member 16B. Sun gear member 16C is connected for common rotation with a third interconnecting shaft or member 46. Planet carrier member 16A is connected for common rotation with a first interconnecting shaft or member 42. Ring gear member 16B is connected for common rotation with input shaft or member 12. Planet gears 16D are configured to intermesh with both sun gear member 16C and ring gear member 16B.

Planetary gear set 18 is a planetary gear set that includes a sun gear member 18C, a ring gear member 18B and a planet carrier member 18A that rotatably supports a set of planet gears 18D. Sun gear member 18C is connected for common rotation with third interconnecting shaft or member 46. Ring gear member 18B is connected for common rotation with a fourth interconnecting shaft or member 48 and fifth interconnecting shaft or member 52. Planet carrier member 18A is connected for common rotation with a sixth interconnecting shaft or member 54 and seventh interconnecting shaft or member 56. Planet gears 18D are each configured to intermesh with both sun gear member 18C and ring gear member 18B.

Planetary gear set 20 is a planetary gear set that includes a sun gear member 20B, a ring gear member 20C and a planet carrier member 20A that rotatably supports a first set of planet gears 20D and a second set of planet gears 20E. Sun gear member 20B is connected for common rotation with an eighth interconnecting shaft or member 58. Ring gear member 20C is connected for common rotation with output shaft or member 22. Planet carrier member 20A is connected for common rotation with seventh interconnecting shaft or member 56. First set of planet gears 20D are configured to intermesh with both sun gear member 20B and second set of planet gears 20E. Second set of planet gears 20E are configured to intermesh with both ring gear member 20C and first set of planet gears 20D.

The torque-transmitting devices or clutches 28, 30, 34 and brakes 26, 32 allow for selective interconnection of the shafts or interconnecting members, members of the planetary gear sets and the housing. For example, first brake 26 is selectively engageable to connect fourth interconnecting shaft or member 48 to transmission housing 50 to restrict rotation of shaft or member 48 relative to housing 50. First clutch 28 is selectively engageable to connect second interconnecting shaft or member 44 to fifth interconnecting shaft or member 52. Second clutch 30 is selectively engageable to connect second interconnecting shaft or member 44 to sixth interconnecting shaft or member 54. Second brake 32 is selectively engageable to connect eighth interconnecting shaft or member 58 to transmission housing 50 to restrict rotation of shaft or member 58 relative to housing 50. Third clutch 34 is selectively engageable to connect output shaft or member 22 to planet carrier 16A.

Referring now to FIGS. 2 and 3, the operation of the embodiment of the eight speed automatic transmission 10 will be described. It will be appreciated that the automatic transmission 10 is capable of transmitting torque from the input shaft or member 12 to the output shaft or member 22 in at least eight forward speed or torque ratios and at least one reverse speed or torque ratio. Each forward and reverse speed or torque ratio is attained by engagement of one or more of the torque-transmitting devices (i.e. first clutch 28, second clutch 30, third clutch 34, first brake 26 and second brake 32), as will be explained below. FIG. 3 is a truth table presenting the various combinations of torque-transmitting devices that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 10. An example of the gear ratios that may be obtained using the embodiments of the present invention are also shown in FIG. 3. Of course, other gear ratios are achievable depending on the gear diameter, gear teeth count and gear configuration selected.

To establish ratios, three torque-transmitting devices are engaged for each gear state. The engaged torque-transmitting devices are represented by an "X" in each respective row. To establish reverse gear, first brake 26, second brake 32 and third clutch 34 and are engaged or activated. First brake 26 connects fourth interconnecting shaft or member 48 to transmission housing 50 to restrict rotation of shaft or member 48 relative to housing 50. Second brake 32 connects eighth interconnecting shaft or member 58 to transmission housing 50 to restrict rotation of shaft or member 58 relative to housing 50. Third clutch 34 connects output shaft or member 22 to planet carrier 16A. Likewise, the eight forward ratios are achieved through different combinations of clutch engagement, as shown in FIG. 3.

It will be appreciated that the foregoing explanation of operation and gear states of the eight speed automatic transmission 10 assumes, first of all, that all clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
   an input member;
   an output member;
   first, second, third and fourth planetary gear sets each having first, second and third members;
   a first interconnecting member continuously interconnecting the first member of the first planetary gear set with the first member of the second planetary gear set;
   a second interconnecting member continuously interconnecting the second member of the first planetary gear set with the second member of the second planetary gear set;
   a third interconnecting member continuously interconnecting the third member of the second planetary gear set with the third member of the third planetary gear set;
   a fourth interconnecting member continuously interconnecting the first member of the third planetary gear set with the first member of the fourth planetary gear set; and
   five torque transmitting devices selectively engageable to interconnect one of the first, second, and third members with at least one other of the first members, second members, third members, and a stationary member, and
   wherein the torque transmitting devices are selectively engageable in combinations of at least three to establish at least eight forward speed ratios and at least one reverse speed ratio between the input member and the output member.

2. The transmission of claim 1 wherein a first of the five torque transmitting devices is selectively engageable to interconnect the second member of the third planetary gear set with the stationary member.

3. The transmission of claim 2 wherein a second of the five torque transmitting devices is selectively engageable to interconnect the third member of the first planetary gear set with the second member of the third planetary gear set.

4. The transmission of claim 3 wherein a third of the five torque transmitting devices is selectively engageable to interconnect the third member of the first planetary gear set with the first member of the third planetary gear set.

5. The transmission of claim 4 wherein a fourth of the five torque transmitting devices is selectively engageable to interconnect the second member of the fourth planetary gear set with the stationary member.

6. The transmission of claim 5 wherein a fifth of the five torque transmitting devices is selectively engageable to interconnect at least one of the third member of the fourth planetary gear set and the output member with the first member of the second planetary gear set.

7. The transmission of claim 1 wherein the third member of the first planetary gear set, the third member of the second planetary gear set, third member of the third planetary gear set and the second member of the fourth planetary gear set are sun gears, the first member of the second, third and fourth planetary gear sets and second member of the first planetary gear set are carrier members and the first member of the first planetary gear set, second member of the second planetary gear set, the second member of the third planetary gear set and the third member of the fourth planetary gear set are ring gears.

8. The transmission of claim 1 wherein the input member is continuously interconnected with at least one of the second member of the first planetary gear set and the second member of the second planetary gear set and wherein the output member is continuously interconnected with the third member of the fourth planetary gear set.

9. The transmission of claim 1 wherein two of the torque transmitting devices are brakes and three of the torque transmitting devices are clutches.

10. The transmission of claim 1 wherein the stationary member is a transmission housing.

11. A transmission comprising:
an input member;
an output member;
first, second, third and fourth planetary gear sets each having first, second and third members, wherein the input member is continuously interconnected with at least one of the second member of the first planetary gear set and the second member of the second planetary gear set and wherein the output member is continuously interconnected with the third member of the fourth planetary gear set;
a first interconnecting member continuously interconnecting the first member of the first planetary gear set with the first member of the second planetary gear set;
a second interconnecting member continuously interconnecting the second member of the first planetary gear set with the second member of the second planetary gear set;
a third interconnecting member continuously interconnecting the third member of the second planetary gear set with the third member of the third planetary gear set;
a fourth interconnecting member continuously interconnecting the first member of the third planetary gear set with the first member of the fourth planetary gear set; and
a first torque transmitting device selectively engageable to interconnect the second member of the third planetary gear set with the stationary member;
a second torque transmitting device selectively engageable to interconnect the third member of the first planetary gear set with the second member of the third planetary gear set;
a third torque transmitting device selectively engageable to interconnect the third member of the first planetary gear set with the first member of the third planetary gear set;
a fourth torque transmitting device selectively engageable to interconnect the second member of the fourth planetary gear set with the stationary member; and
a fifth torque transmitting device selectively engageable to interconnect at least one of the third member of the fourth planetary gear set and the output member with the first member of the second planetary gear set, and
wherein the torque transmitting devices are selectively engageable in combinations of at least three to establish at least eight forward speed ratios and at least one reverse speed ratio between the input member and the output member.

12. The transmission of claim 11 wherein the third member of the first planetary gear set, the third member of the second planetary gear set, third member of the third planetary gear set and the second member of the fourth planetary gear set are sun gears, the first member of the second, third and fourth planetary gear sets and second member of the first planetary gear set are carrier members and the first member of the first planetary gear set, second member of the second planetary gear set, the second member of the third planetary gear set and the third member of the fourth planetary gear set are ring gears.

13. The transmission of claim 11 wherein the stationary member is a transmission housing.

14. A transmission comprising:
an input member;
an output member;
first, second, third and fourth planetary gear sets each having a sun gear, a carrier member, and a ring gear, the input member is continuously interconnected with at least one of the carrier member of the first planetary gear set and the ring gear of the second planetary gear set and wherein the output member is continuously interconnected with the ring gear of the fourth planetary gear set;
a first interconnecting member continuously interconnecting the ring gear of the first planetary gear set with the carrier member of the second planetary gear set;
a second interconnecting member continuously interconnecting the carrier member of the first planetary gear set with the ring gear of the second planetary gear set;
a third interconnecting member continuously interconnecting the sun gear of the second planetary gear set with the sun gear of the third planetary gear set;
a fourth interconnecting member continuously interconnecting the carrier member of the third planetary gear set with the carrier member of the fourth planetary gear set; and
a first torque transmitting device selectively engageable to interconnect the ring gear of the third planetary gear set with a stationary member;

a second torque transmitting device selectively engageable to interconnect the sun gear of the first planetary gear set with the ring gear of the third planetary gear set;

a third torque transmitting device selectively engageable to interconnect the sun gear of the first planetary gear set with the carrier member of the third planetary gear set;

a fourth torque transmitting device selectively engageable to interconnect the sun gear of the fourth planetary gear set with the stationary member; and a fifth torque transmitting device selectively engageable to interconnect at least one of the ring gear of the fourth planetary gear set and the output member with the carrier member of the second planetary gear set, and wherein the torque transmitting devices are selectively engageable in combinations of at least three to establish at least eight forward speed ratios and at least one reverse speed ratio between the input member and the output member.

15. The transmission of claim 14 wherein the stationary member is a transmission housing.

* * * * *